(12) United States Patent
Möseneder (10) Patent No.: US 7,607,730 B2
(45) Date of Patent: Oct. 27, 2009

(54) UPHOLSTERY FOR A PASSENGER SEAT (75) Inventor: Johann Möseneder, Thalheim/Wels (AT)

(73) Assignee: Greiner Purtec GmbH (AT)

( * ) Notice: Subject to any disclaimer, the term of this patent is extended or adjusted under 35 U.S.C. 154(b) by 0 days.

(21) Appl. No.: 11/499,324

(22) Filed: Aug. 4, 2006

(65) Prior Publication Data
US 2007/0123129 A1   May 31, 2007

(30) Foreign Application Priority Data
Aug. 8, 2005  (AT) .............................. A 1330/2005

(51) Int. Cl.
A47C 31/00   (2006.01)
A47C 27/00   (2006.01)
B32B 5/18    (2006.01)

(52) U.S. Cl. ................. 297/218.3; 442/315; 297/218.1; 297/218.2; 297/216.1; 297/218.5

(58) Field of Classification Search ................. 442/304, 442/312, 313, 315, 318, 319; 297/216.1, 297/218.1, 218.2, 218.3, 218.5
See application file for complete search history.

(56) References Cited

U.S. PATENT DOCUMENTS 5,248,185 A * 9/1993 Weingartner et al. ... 297/452.58
5,589,245 A * 12/1996 Roell .......................... 428/85
6,065,809 A * 5/2000 Hoger ...................... 297/452.5
6,068,332 A * 5/2000 Faust et al. ............. 297/180.13

FOREIGN PATENT DOCUMENTS

| AT | 004 727 U1 | 11/2001 |
| DE | 85 06 816 | 7/1985 |
| DE | 42 09 468 | 10/1992 |
| DE | 44 38 018 | 5/1995 |
| DE | 201 18 250 | 5/2002 |
| DE | 203 02 364 | 5/2003 |
| EP | 0 190 064 | 8/1986 |
| EP | 0 617 152 | 9/1994 |
| EP | 1 447 030 | 8/2004 |
| GB | 2 009 266 | 11/1978 |
| WO | WO 87/06894 | 11/1987 |

* cited by examiner

Primary Examiner—Lynda Salvatore
(74) Attorney, Agent, or Firm—Lerner, David, Littenberg, Krumholz & Mentlik, LLP (57) ABSTRACT

The invention pertains to an upholstery (5) for a passenger seat (1), particularly an aircraft seat, that comprises at least one layer (7, 26) in the form of a textile surface (8) consisting of threads (9 to 11) and/or fibers forming these threads (9 to 11). The textile surface (8) is at least regionally formed by a knitted spacer fabric composed of at least two layers (12, 13) that are spaced apart from one another and pile threads extending therebetween, wherein the textile surface (8) can be at least regionally connected to a supporting frame (6). At least one functional element (19) is at least regionally assigned to the textile surface (8).

44 Claims, 2 Drawing Sheets

UPHOLSTERY FOR A PASSENGER SEAT

CROSS REFERENCE TO RELATED APPLICATIONS

Applicant claims priority under 35 U.S.C. §119 of Austrian Application No. A 1330/2005 filed Aug. 8, 2005.

BACKGROUND OF THE INVENTION

1. Field of the Invention by a knitted spacer fabric composed of at least two layers that are spaced apart from one another and pile threads extending therebetween, and wherein the textile surface can be at least regionally connected to a supporting frame.

2. The Prior Art

Textile surfaces for furniture such as, for example, chairs, backrests, sitting and reclining surfaces are disclosed in DE 201 18 250 U1 and AT 004 727 U1, respectively. In this case, the textile surface produced with a knitting machines is tentered between at least two frame parts. For reasons of simplicity, the entire textile surface is dimensionally knitted in the required shape. The textile surface furthermore features knitted borders with a narrower mesh width than the surfaces of the textile surface lying therebetween. The knitted borders have the shape of a knitted tube, wherein the tube edges can be pulled over rod-shaped frame elements of the furniture or inserted into holding grooves of the frame parts. The threads for the knitted textile consist of elastic plastic fibers such as, for example, Trevira CS 167F 64 X1.

A different type of upholstery for furniture is disclosed in EP 1 447 030 A1 and DE 203 02 364 U1, respectively. This upholstery features at least one knitted pile fiber fabric with an adjusting device arranged on at least one edge. This makes it possible to vary the prestress of the knitted pile fiber fabric and to thusly achieve a different firmness regardless of the state of stresses. The knitted pile fiber fabric is realized in a self-supporting fashion, wherein loops or a tube are/is directly knitted to the knitted pile fiber fabric in the edge region. The knitted pile fiber fabric has a superior air permeability such that no accumulation of heat or moisture occurs therein. These properties can be additionally promoted if the knitted pile fiber fabric is at least regionally made of a hydrophobic and/or hydrophilic material. In knitted pile fiber fabrics, the body movement also causes a movement of the air between the two cover layers such that additional mechanical ventilation of the upholstery can be entirely eliminated under certain circumstances. The knitted pile fiber fabric may furthermore consist of an antistatic material or a material that shields electromagnetic radiation. UV-resistant and fast-drying materials can furthermore be utilized.

In another knitted spacer fabric known from GB 2 009 266 A, the knitted spacer fabric is used as padding for furniture or seats. This knitted spacer fabric used in the form of padding may be additionally provided with a cover such that adequate ventilation can take place thereunder. The threads for the cover layers consist of nylon monofilaments and the pile threads consist of polypropylene. The threads may furthermore have different cross sections and also consist of film strips. The knitted spacer fabric can be realized such that it is easily washable and non-flammable.

A textile spacer material of variable thickness, as well as a method for the production thereof, is disclosed in EP 0 617 152 B1. This textile spacer material is produced on a knitting machine and features an upper and a lower cover layer of knitted material. The cover layers are connected to one another by means of at least one pile fiber structure, wherein the cover layers and the pile fiber structure consist of knitted material or partially knitted and partially woven material. The textile spacer material furthermore has a three-dimensional shape that is achieved by varying the pile fiber length, the pile fiber density and/or the pile fiber material, as well as by increasing and decreasing the stitches. The thickness of the spacer material is varied by changing the pile fiber length. Flat structures such as patterns, structural variations and/or color variations are realized on the cover layers. The material of a pile fiber is chosen such that it reacts in a reversible, partially reversible or irreversible fashion to chemical or physical influences. Suitable starting materials are all fiber materials that can be processed on knitting machines, e.g., monofilaments, multifilaments and multicomponent filaments. In addition, natural and synthetic fibers as well as wires or mineral material such as glass fibers or stone fibers can be used. The fiber material may also be covered by spinning, sheathed, spin-wrapped and/or surface-coated. If the pile fiber consists of a relatively rigid material, e.g., a monofilament, and the cover layers are made of a material that becomes shorter at elevated temperatures, it is possible to realize a contraction of the cover layers if they are heated while the pile fiber material essentially remains unchanged.

A known seat with a cushion of foamed plastic—according to WO 87/06894 of the same applicant—consists of a foamed plastic with a supporting member of an elastic open-cell plastic foam that has a first volume weight and a flame protevtive layer of an elastic open-cell foamed plastic that is provided with a flame retardant and has a second volume weight that differs from the first volume weight. The plastic foam and the flame protective layer are connected to one another, particularly by means of an expansion process, and surrounded by a hardly inflammable cover fabric. In order to achieve a sufficient air permeability of such a cushion, it was proposed to push needless through the cushion after its production in order to allow a corresponding air exchange. These cushions proved to perform well in practical applications, but it was determined that the seats were not sufficiently comfortable for the intended application in vehicles, primarily under extreme weather conditions or varying climatic conditions.

Known seats for public transportation means—according to DE 85 06 816 U—feature a seat cushion that is covered with a seat cover, wherein the seat cover and the seat cushion consist of a hardly inflammable and low-fuming material. In this case, a glass fiber mat is frequently arranged between the hardly inflammable seat cover and the seat cushion that usually consists of plastic foam so as to prevent the seat cover from burning through in the direction of the seat cushion. However, it was determined that flames affect such seats from the bottom in many instances and that the plastic foam has a tendency to develop significant smoke while it burns such that the public transportation means are quickly filled with so much smoke in case of a fire that the passengers become disoriented. Consequently, a flame-retarding plate is arranged underneath the seat cushion of this seat in the supporting frame thereof.

Seats with cushions of foamed plastic are widely used in the construction of modern vehicles. They are primarily used in rail and road vehicles, but also very popular in aircraft. Although rail vehicles are subject to very strict regulations with respect to the self-extinguishing properties and the smoke development of the materials used, the applicable regulations in the aircraft industry are even stricter. For example, seats authorized for use in aircraft need to undergo a test in which the cushions are directly exposed to the flame of a burner in the state in which they are subsequently installed. This flame directly acts upon the cushion for a duration of 2 minutes, whereafter the flame is extinguished or removed. The cushion is extinguished after 5 minutes if the flames are not already self-extinguished at that time. The weight loss of the cushion cannot exceed 10% after this fire test. In order to fulfill these extremely strict regulations and simultaneously provide the passengers with highly comfortable yet low-weight seats on long-distance flights, seat cushions of different soft, elastic open-cell plastic foams with different volume weights were treated with flame retardants and bonded together. One known vehicle seat of this type—according to EP 0 190 064 A1—consists of several layers of needle-punched nonwoven that are covered with a flame-retarding cover fabric. Reinforcing mats of metal or glass fibers are arranged between the cover fabric and the individual layers of needle-punched nonwoven in order to reduce damages due to vandalism. In light of the fact that the individual layers are bonded together and this vandalism protevtive layer features multiple intermediate layers, it is hardly possible to achieve sufficient ventilation of this known vehicle seat.

In another known seat for aircraft, the complicated three-dimensional shape of the seat cushions is simplified by realizing the one-piece supporting member in the form of a part that is integrally expanded in a mould and treated with flame ratardants, wherein the surface of this expanded part is covered with a flame protective layer and then with a flame-retarding cover fabric. However, these known seats cannot fulfill the safety regulations and test requirements for aircraft seats that recently became even stricter and are also insufficient with respect to cost-efficient cleaning and maintenance times.

Other seat cushions, particularly for aircraft, are disclosed in DE 42 09 468 A1 and DE 44 38 018 A1, wherein the supporting member of the seat cushion consists of at least two different components that are connected to one another, particularly in a separable fashion. In this case, one component forms a supporting element and another component forms an upper element. The supporting element may consist of several parts, wherein an additional insert is arranged between a front and/or rear edge of the supporting element and/or upper element and approximately in a central region thereof, namely at least over part of the thickness of the supporting element and/or upper element. This insert is harder than the supporting element and/or the upper element, but the volume weight of the insert is lower than the volume weight of the supporting element. It is furthermore possible to arrange an additional supporting device, particularly a spring core, in the support section of the supporting element.

SUMMARY OF THE INVENTION

The present invention is based on the objective of developing an upholstery for a passenger seat that is able to withstand the exceptional stresses occurring in public transportation means, particularly aircraft seats, and simultaneously provides the user with a comfortable seating surface, namely also over extended periods of time.

This objective of the invention is attained in that at least one functional element is at least regionally assigned to the textile surface.

The surprising advantage attained with the characteristics disclosed in the characterizing portion of claim 1 can be seen in that the assignment of at least one functional element makes it possible realize or improve all sorts of properties of the upholstery formed by the textile surface. A simple manufacture and a simple installation on the supporting frame is achieved due to the utilization of the knitted spacer fabric. Furthermore, the textile surface forms a component of the upholstery that already absorbs or diverts forces acting thereupon and has a low weight as a well as a sufficient stability, wherein the textile surface also makes it possible to achieve adequate ventilation and to thusly carry off heat supplied by the user. The different requirements for any conceivable application of the upholstery can be fulfilled by assigning different functional elements.

The embodiment according to claim 2 is advantageous in that its three-dimensional shape and dimensions result in a knitted spacer fabric that requires no subsequent processing at all and already contains an integrated functional element or can be subsequently provided therewith. The automated production of the dimensionally knitted textile surface furthermore is very cost-efficient.

The embodiment according to claim 3 is advantageous in that it allows an even more individual design of the textile surface and thusly improves the design options with respect to combining the seating comfort with the attainable carrying capacity or stability.

The embodiment according to claim 4 makes it possible to increase the carrying capacity and, in association therewith, the forces to be absorbed by the textile surface. This is particularly important with respect to possibly occurring emergencies because higher forces acting upon the textile surface, for example during emergency landings, can be transmitted into the supporting frame without completely destroying the textile surface and thusly creating a source of possible injuries to the user.

In another embodiment that is disclosed in claim 5, it is possible to individually adapt the upholstery to the user requirements for different applications of the upholstery. In addition, this embodiment makes it possible to achieve a controlled air exchange within the threads of the textile surface.

The additional development according to claim 6 is also advantageous in that a simple connection can be produced between the knitted spacer fabric and the supporting frame such that an increased strength and a reduced extension of the textile surface toward the supporting frame can be achieved in its edge region.

In the embodiment according to claim 7, it is advantageous that a simple installation can be achieved with predetermined openings in the region of the knitted border that can be penetrated by correspondingly designed holding elements arranged on the supporting frame, for example, pins or hooks. This makes it possible to easily arrange and remove the textile surface on/from the supporting frame without any auxilliary means e.g., when the textile surface needs to be cleaned or exchanged.

Due to the additional development disclosed in claim 8, the textile surface is held on the supporting frame over its entire length. This tubular design of the knitted border makes it possible to either place the textile surface over the supporting frame or to fix the textile surface within the supporting frame by inserting a rod-shaped or tubular component similar to a welt-type connection.

The additional developments according to claims 9 to 11 are advantageous in that the knitted spacer fabric of the textile surface can be at least regionally realized for different service conditions. In addition to the selection of the material for the threads or fibers used in the production of the knitted spacer fabric, these measures make it possible to influence or change the properties depending on the coating or impregnation used.

The design according to claim 12 makes it possible to take into account the strict regulations that apply to public transportation means and to thusly realize, for example, otherwise flammable threads or fibers in a flame-retarding fashion. This allows the utilization of materials that improve the seating comfort and the seating climate while still conforming with these strict regulations.

The selection of various thread or fiber materials used in the production of the textile surface in accordance with claims 13 to 15 also makes it possible to take into account different service conditions, wherein different material properties can also be easily combined by choosing the threads or fibers accordingly.

The utilization of elastomer fibers in accordance with claim 16 or 17 not only improves the elasticity of the threads, but also the elasticity of the knitted fabric produced with these threads such that the knitted fabric can be easily deformed in accordance with the respectively applied stress and also return to its original shape.

Fibers or threads with a low elasticity are selected from the staple fibers according to claim 18 such that very good flame-retarding properties of the knitted fabrics are achieved and this knitted fabric is also suitable for use in heat-exposed applications while still providing a high degree of safety and sufficient comfort for the user. It is also advantageous that these materials have a very high ignition temperature. The cited materials also have permanent flame-retarding properties and no afterglow.

The embodiment according to claim 19 is advantageous in that the utilization of carbon fibers not only results in a high stability, but also significantly higher rigidities of the knitted fabric, wherein the specific weight can be maintained low. Carbon fibers therefore are particularly suitable for a lightweight yet somewhat rigid construction of the knitted fabric. It is also advantageous that the fatigue strength under dynamic loads is exceptional and that the thermal expansion is very low. Knitted fabrics consisting or partially consisting of carbon fibers are also electrically conductive.

The combination of different fiber materials in accordance with claim 20 makes it possible to advantageously combine the properties of the individual fibers. The flame-retarding property of the knitted aramide and/or paraaramide fabric is advantageously combined with the properties of carbon or metal fibers that have a high strength and a low specific weight, as well as the properties of elastomer fibers, namely the ability to be extended and subsequently return to the original state.

The embodiment according to claim 21 is also advantageous in that the textile surface at least regionally withstands the effect of flames, namely without the textile surface requiring any subsequent treatments, and that only a few parts are subject to combustion. This also minimizes the smoke development.

The embodiment according to claim 22 is advantageous in that the arrangement of additional lines for forwarding signals can be eliminated. The upholstery can furthermore be heated, at least in regions thereof.

Depending on the selection of the functional element, the embodiments allow a simple variation of the upholstery structure such that various requirements can be easily taken into account.

The additional developments according to claim 23 or 24 are advantageous in that the functional element can also be protected in the region of its underside such that it is possible, for example, to reduce or prevent the effect of flames and the admission of dirt, respectively. This embodiment also makes it possible to easily fix the position of the functional element relative to the upholstery.

The embodiment according to claim 25 allows another individual adaptation of the upholstery to various service conditions. This can be realized from the service side in order to improve the seating comfort and to protect the textile surface.

An advantageous additional development makes it possible to realize a step-by-step support of the weight acting upon the upholstery. A first support can be realized with the textile surface and another support is realized with the functional element that is arranged distant from the textile surface. An adequate ventilation can be achieved with these measures in many instances, wherein even higher loads can be absorbed by the entire upholstery without negatively influencing the seating comfort.

The embodiment according to claim 26 is also advantageous in that the intermediate space of the knitted spacer fabric situated between the layers not only serves for diverting loads by means of the pile threads, but also for arranging various functional elements within the knitted spacer fabric.

In another embodiment that is disclosed, textile surfaces of different designs can be used for producing the upholstery. This makes it possible to improve the seating comfort on the side facing the user and to provide the layer of the textile surface that serves for transmitting high loads on the side facing away from the user.

Another possible option in this respect is to create additional space for accommodating the functional elements assigned to the upholstery and to arrange the functional elements between the layers. Consequently, these layers simultaneously form a protection for the functional elements (s).

The embodiments disclosed make it possible to individually influence the temperature in accordance with user requirements. It is possible to select heating and/or cooling modes such that the accumulation of heat in the region of the seat is also prevented on longer flights and a tempering option is provided for idle periods.

The seating surfaces can be easily adapted to various requirements in this fashion and the pilot or the flight crew is simultaneously able to obtain information, for example, on the respectively occupied seats or the like.

Another embodiment makes it possible to additionally improve the seating comfort. The support characteristics can furthermore be quickly and individually adapted to the respective user of the upholstery.

It is also advantageous in that a component of the upholstery that additionally improves the seating comfort is added to the textile surface. The upholstery can be adapted to various requirements in dependence on the arrangement of the foamed plastic element. The hardness as well as the counter-pressure exerted upon the user by the upholstery can be better distributed over the surface of the upholstery in this fashion.

The embodiment according to claim 28 provides universal options for adapting the upholstery to various service conditions. Depending on the intended use, the respective upholstery requirements can be easily fulfilled and the seating characteristics can be favorably influenced due to the various options for combining different foamed plastics.

Due to the additional development according to claim 29 or 30, an optimal ratio between the overall weight of the component and the mass available for combustion in case of a fire is observed due to the favorable combination of the volume weight and the hardness of the plastic foam. In addition, adequate seating comfort is provided for a user despite the observation of the required compression strength such that a comfortable seating climate is also maintained when the seat is subjected to long-term stress.

The embodiment according to claim 31 or 32 is also advantageous in that the upholstery provides superior comfort and can be produced in a less costly fashion, wherein the seating comfort is preserved and the required support and safety parameters in case of an emergency can be observed. This makes it possible to achieve an optimal support of the entire upholstery on the carrying or supporting elements arranged thereunder while simultaneously avoiding or preventing the penetration of supporting parts in the direction of the user.

In the embodiment according to claim 33 or 34, it is advantageous that the user is provided with a high seating comfort due to the selection of the plastic foam, wherein a complete collapse of the foamed structure is prevented in connection with the chosen thickness and volume weight and thus the attainable hardness.

The additional development according to claim 35 makes it possible to provide a flexible foam layer for improving the seating comfort under extended static loads and for absorbing significant forces occurring under abrupt loads, i.e., a superior damping effect of the upholstery is achieved.

According to the embodiments described in claims 36 to 37, a collapse of the foamed structure during extended use is prevented such that the cell walls of the foamed structure do not adhere or stick to one another. In addition, a favorable seating climate for the user is simultaneously created.

In the embodiment according to claim 38, the utilization of flame retardants favorably influences the combustion characteristics of the plastic foam.

The embodiments according to claims 39 to 40 are also advantageous in that a self-extinguishing time of the plastic foam can be adjusted such that the combustion time can be controlled and the strict limiting values for respective application can be observed or adapted. A low smoke development or the development of light smoke during the combustion is achieved, in particular, with the addition of melamine or melamine resin, respectively. This prevents the development of excessive smoke in the vehicle interior, particularly the aircraft cabin, such that the emergency exits can be recognized better and more reliably in case of an emergency.

It is also advantageous in that the ratio of attained weight to combustion resistance can be optimized by choosing the quantity of added flame retardants accordingly.

It is possible to achieve a higher combustion resistance with respect to primary ignitions, wherein a high secondary extinguishing effect is simultaneously attained due to be released components such that external fires can be contained and extinguished, respectively.

The additional developments according to claims 41 to 43 are advantageous because various protective effects can be realized under different influences such as, e.g., flames, dirt, etc., due to the different options for realizing and arranging the protective layer on the upholstery or the components forming the upholstery. This additionally protects the plastic foam from the direct influence of flames such that it is not immediately subjected to the flames and the smoke development during the combustion can be additionally reduced.

BRIEF DESCRIPTION OF THE DRAWINGS

The invention is described in greater detail below with reference to the embodiments illustrated in the figures. The figures show.

DETAILED DESCRIPTION OF PREFERRED EMBODIMENTS

It should be initially noted that identical components are identified by the same reference symbols or identical component designations in the different embodiments described, wherein characteristics disclosed in the overall description can be transferred analogously to identical components identified by the same reference symbols or the same component designations, respectively. In addition, information on positions such as, e.g., top, bottom, laterally, etc., refers to the respectively described figure and needs to be transferred analogously if the position changes. Furthermore, individual characteristics or combinations of characteristics of the different illustrated and described embodiments may represent independent innovative or inventive solutions.

All information regarding the value domains in the following description should be understood in such a way that they include any and all subdomains thereof, e.g., the designation 1 to 10 should be understood as including all subdomains from the lower limit 1 to the upper limit 10, i.e., all subdomains begin with a lower limit of 1 or more and end with an upper limit of 10 or less, e.g., 1 to 1.7, 3.2 to 8.1 or 5.5 to 10.

Figure 1:
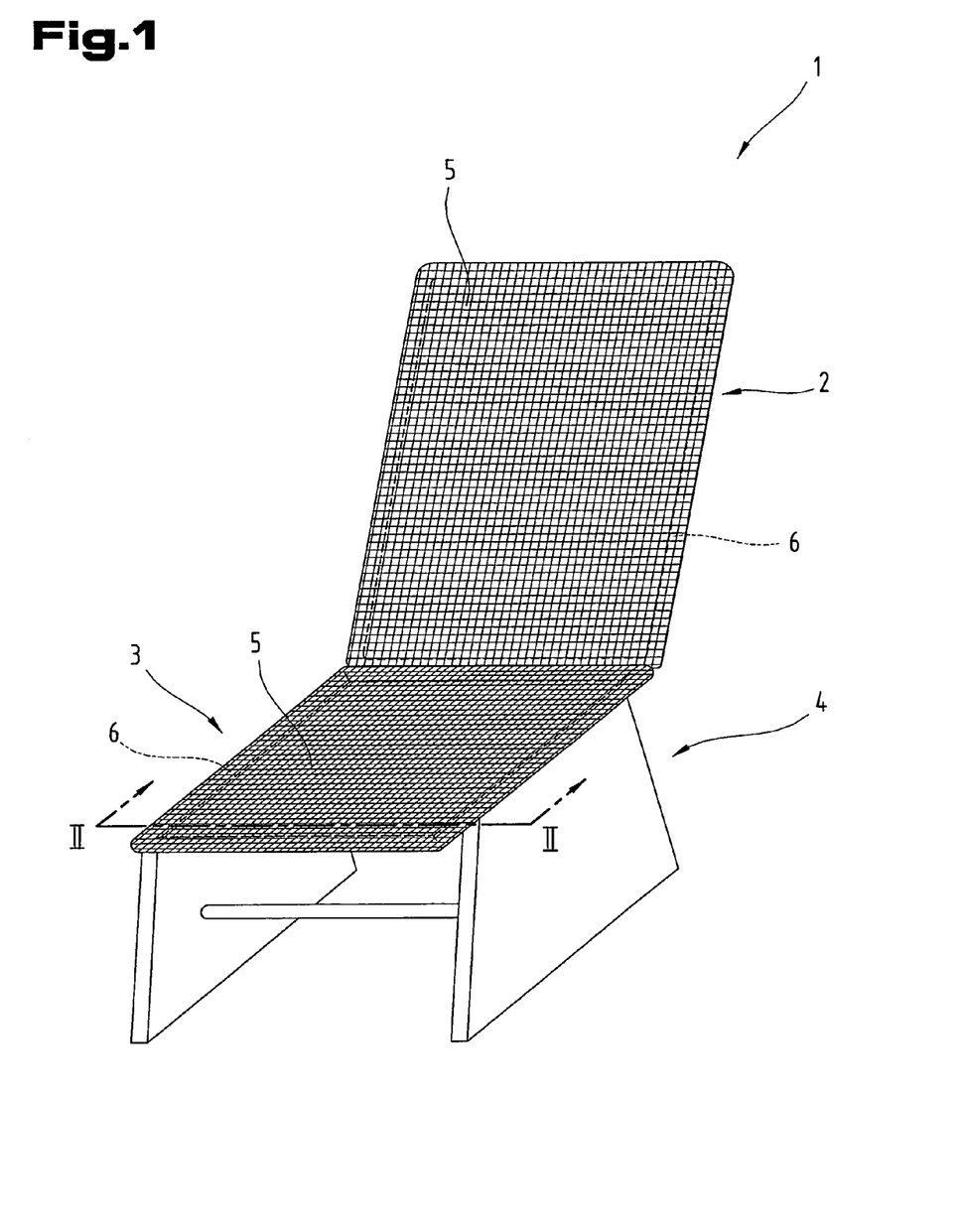
FIG. 1 a passenger seat with schematically illustrated upholstery.

FIG. 1 shows a simplified representation of a passenger seat 1 that comprises a backrest 2, a seat part 3 and a supporting frame 4. The backrest 2 as well as the seat part 3 furthermore comprise an upholstery 5 that is respectively secured on the supporting frame 6 illustrated in a simplified fashion. The passenger seat 1 shown may consist, for example, of an aircraft seat, a seat in public transportation means, e.g., a seat in a rail car or a bus, a subway or a seat in an automobile. It should also be noted that the passenger seat shown is only illustrated in a simplified, schematic fashion, wherein the structure of the upholstery 5 is described in greater detail below with reference to the ensuing figures.

The supporting frame(s) 6 may be connected to the supporting frame 4 by means of various known methods, wherein this connection is not illustrated in detail in order to provide a better overview. The supporting frame 4 as well as the supporting frame(s) 6 may also have different shapes depending on the respective application. Although also not illustrated in detail, it would be conceivable to provide elements for supporting the lower leg and foot areas of a passenger that are also provided with the upholstery 5. Various elements known from the state of the art can also be used for realizing the back rest 2 in such a way, for example, that its incline relative to the seat part 3 is adjustable. It would also be possible to provide arm rests or arm supports that are also not illustrated in the figures.

Figure 2:
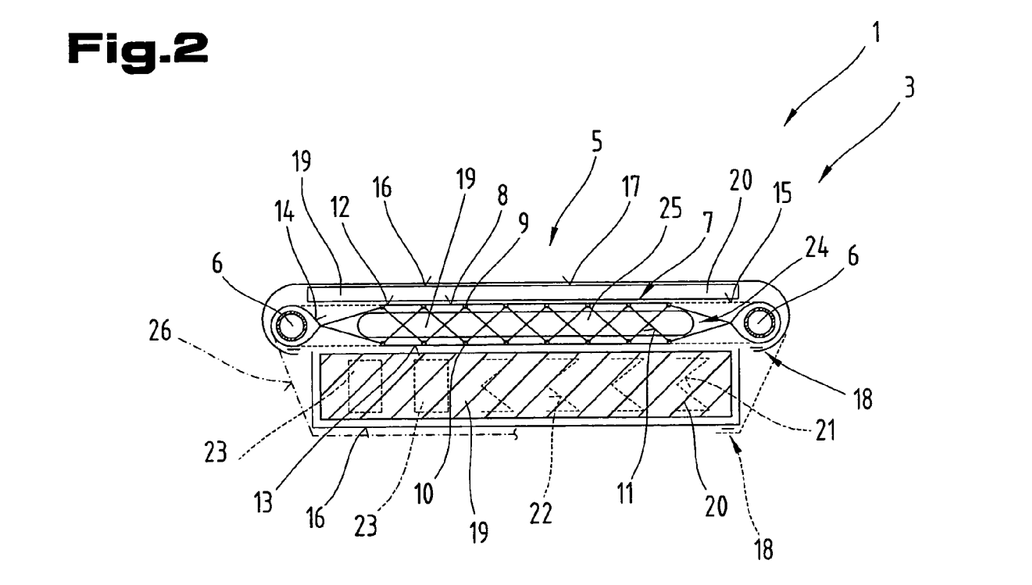
FIG. 2 a section through the upholstery along the line II-II in FIG. 1.

FIG. 2 shows a simplified section through the upholstery 5 of the seat part 3, wherein it should be noted in this context that the different embodiments of the upholstery 5 can also be used for the backrest 2 and the support for the lower leg or foot area, respectively.

The simplest embodiment of the upholstery 5 comprises at least one layer 7 in the form of the textile surface 8 that consists of a so-called knitted spacer fabric or knitted pile thread fabric made of individually illustrated threads 9 to 11. This knitted spacer fabric or knitted pile thread fabric consists of at least two layers 12, 13 that are spaced apart from one another, as well as pile threads extending therebetween. In this case, the pile threads may consist of one of the aforementioned threads 9 to 11.

In this embodiment, the layer 12 of the textile surface 8 faces the not-shown user of the passenger seat 1 and can also be referred to as upper section. The other layer 13 is spaced apart from the aforementioned layer and can also be referred to as lower section. Such knitted spacer or pile thread fabrics can be produced, for example, on self-acting knitting machines, dual-gripper weaving machines as well as knitting machines. Depending on the chosen production method, the pile threads, for example the thread 11, spaces apart the two layers 12, 13 in the vertical direction. This makes it possible to produce flat, 2 ½-dimensional and/or three-dimensional structures of the textile surface 8. A more detailed description of methods for producing such a knitted spacer or pile thread fabric is not provided because they are already known from the general state of the art.

The textile surface 8 shown forms at least one layer 7 of the upholstery 5, wherein the textile surface 8 is at least regionally connected to the supporting frame 6. In order to simplify the installation or attachment of the textile surface 8 on the supporting from 6, knitted borders 14 are at least regionally provided on the outer periphery of the textile surface. The knitted border 14 could—as illustrated in a simplified fashion—be designed for accommodating, for example, a tube arranged on the supporting frame 6. During the installation of the textile surface 8, its tubularly designed knitted borders 14 can be placed over the supporting frame(s) 6 in order to thusly fasten the upholstery 5.

However, it would also be possible to arrange a slot in the supporting frame 6 on the respective sides that face the textile surface 8, wherein a rod or tube that has a smaller cross section than the supporting frame 6 is inserted into the tubular knitted border 14 and the thusly formed unit is fixed in the supporting frame 6 similiar to a welt-type connection in order to fasten the textile surface 8 on the supporting frame 6.

Independently thereof, it would also be possible to realize several not-shown openings in the knitted border 14 that are spaced apart from one another, namely in the longitudinal direction of the knitted border. In order to fasten the textile surface 8, the knitted border 14 with its openings is secured on holding elements such as, for example, pins provided on the supporting frame 6 such that the textile surface 8 is held on the supporting frame 6. These holding elements in the form of pins or hooks may be arranged, for example, in the region of the underside and rear side of the backrest 2 and the seat part 3 so as to minimize or eliminate the risk of injuries or getting caught.

It is furthermore advantageous that the entire textile surface 8 is dimensionally knitted in the required shape or three-dimensional shape, namely in the form of a one-piece textile surface that also includes the knitted borders 14. Consequently, at least one layer 7 of the upholstery 5 is created that is completely finished with respect to its shape and dimensions such that no subsequent processing is required, for example, sewing on fastening devices, loops or the like.

During the course of the production of the textile surface 8, it is also possible to realize certain designs on the side of the upholstery 5 facing the user. This can be achieved during the course of the production process, for example, in the form of a pattern knitted with threads of different colors, e.g., logos, images, seat numbers or the like. This makes it possible to individually adapt the appearance of the upholstery 5 to the respective operator or owner of the airline, railroad line, bus company or automobile manufacturer, respectively.

It is furthermore possible to subject the textile surface 8 to different prestresses that are directed parallel to the textile surface 8 with the aid of not-shown means or to realize the prestress variably so as to improve and individualize the adaptation of the hardness to the respective user of the passenger seat 1. An increased prestress results in a stronger or more intense counterpressure being exerted upon the user. It is therefore possible to individually adapt the upholstery 5 to the body weight or the individual perception and requirements of the user in a simple and uncomplicated fashion. The textile surface 8 for the upholstery 5 represents a component the contains significantly less material and can be easily cleaned, exchanged or replaced. Despite the high forces to be absorbed, the textile surface also has a low weight such that potentially significant savings with respect to the transport volume or weight can be realized. The costs for the day-to-day operation can be lowered in this fashion.

Due to the numerous options for producing the textile surface 8, said textile surface 8 can be realized such but its thickness and therefore the vertical spacing between the two layers 12 and 13 differs over its surface area. For example, this makes it possible to realize a harder and firmer textile surface 8 in the more significantly stressed seat region than in the region facing the thighs. Consequently, the risk of embolisms due to thromboses while sitting for extended periods of time on long-distance flights is reduced or eliminated. One reason for this was usually a vein thrombosis that resulted in a blood clot formed in the leg to be transported as far as the heart and already cause medical damages thereto and then to clog a pulmonary artery or to be additionally transported to the lungs and cause damages to this organ. It is therefore important to maintain the blood circulation in the region of the thighs at a largely normal level such that the pressure exerted upon the veins in the legs by the seat remains low.

The individual threads 9 to 11 are illustrated in a simplified fashion and may be composed of a plurality of fibers that are combined into a thread 9 to 11. The individual threads 9 to 11 or fibers may consist, for example, of an organic and/or inorganic and/or metallic material and respectively have different elasticities and/or hardnesses and/or dimensions. The threads 9 to 11 or fibers may furthermore be selected from the group of materials that comprises glass, carbon, aramide, metal, steel, ceramic, plastic, carbon, cotton, hemp as well as animal hair. The fibers may furthermore consist of elastomer fibers of polyurethane, polyether amide, polyester amide, polyolefin components, polyester components or a mixture thereof. The elastomer fibers may also consist of Elastan®, Lycra® or other commercially available elastomer fibers or a bicomponent fiber. In addition, the fibers or threads 9 to 11 may be selected from staple fibers of a group that comprises aramide and/or paraaramide fibers such as Kevlar® (poly(p-phenylene- terephthalamide), Nomex® (aramide of m-phenylenediamin and isophthalic acid), Twaron®, Technora, Teijinconex, phenol-formaldehyde fibers such as Kynol, polyamide/polyimide fibers such as Kermel, polybenzimidasole fibers or fiber mixtures thereof. In addition, the aramide and/or paraaramide fibers may be mixed with carbon fibers (Beltron®, Zefstat, Negastat, Resistat), steel fibers, copper fibers and/or metal fibers. However, it would also be conceivable to mix the aramide and/or paraaramide fibers with carbon or metal fibers and elastomer fibers.

In order to conform to the strict standards and regulations in the aircraft industry, it is advantageous that at least individual threads 9 to 11 or fibers of the textile surface 8 of the knitted spacer fabric are realized in a flame-retarding and/or electrically conductive fashion. However, it would also be possible to provide at least individual threads 9 to 11 or fibers of the textile surface 8 of the knitted spacer fabric with a coating and/or impregnation. The coating and/or impregnation may consist, for example, of nanoparticles, varnishes, surface refinements, etc. It this furthermore advantageous to realize the coating and/or impregnation in a fire-retarding fashion.

The textile surface 8 of the knitted spacer fabric can be at least regionally realized in the form of a so-called knitted V-belt fabric 15 as indicated with broken lines in order to increase the stability. In this case, individual threads 9-11 are wrapped around the supporting frame(s) 6 and extend continuously therebetween. A connection with the pile thread can also be produced in this case. This makes it possible to absorb abrupt loads as required or prescribed, for example, in connection with emergency landings. This knitted V-belt fabric 15 can be integrated into and therefore form part of the textile surface 8 and extend transverse to the upholstery as well as in the direction of its depth. This not only makes it possible to achieve a corresponding seating comfort, but also to absorb abrupt loads in order to reduce the risk of injuries to the user due to tearing of the textile surface and a collision with the supporting frame 4 or other parts.

This simplified illustration also shows that the upholstery 5, if so required, is at least regionally provided with a protective unilayer 16 that may consist, for example, of a flame-retarding cover fabric 17. The protevtive layer 16 may be arranged, for example, at least in the region of the upholstery 5 facing the user. The protevtive layer 16 preferably spans the textile surface 8 and at least regionally comprises the supporting frame 6, on which it can be fastened or held by means of a connecting device 18 that is illustrated in a simplified fashion, for example, a Velcro fastener or the like. This makes it possible to realize the textile surface 8 such that it is able to absorb and support the forces exerted thereupon by the user while the protevtive layer 16 fulfills the function of covering and protecting the textile surface 8. This makes it possible to easily clean and, if so required, exchange the upholstery. If the protevtive layer 16 comprises several layers, it may also consist of a plastic foam that is saturated with a liquid flame retardant.

According to the simplified illustration shown in FIG. 2, the upholstery 5 is at least regionally bordered by at least one functional element 19 assigned to the textile surface 8. Various arrangement and assignment options as well as various optional designs of the functional elements 19 are described below and may be arbitrarily combined with one another. In the embodiment shown, one of the functional elements 19 is realized in the form of at least one foamed plastic element 20 the is arranged on the side of the textile surface 8 facing away from the user. For example, the foamed plastic element 20 may be spaced apart from the textile surface 8 in order to enable the textile surface to deform, in which case the textile surface only comes in contact with the foamed plastic element 20 after a more significant deformation thereof in order to provide additional support. The foamed plastic element 20 can be braced or supported on a component of the supporting frame 4 that is not illustrated in detail.

Due to the prestress and the associated carrying capacity of the textile surface 8, the weight of the user acting upon the upholstery 5 is at least predominantly transmitted from the upholstery to the supporting frame 6. If the upholstery 5 is subjected to even higher loads in the direction of the foamed plastic element 20, for example, by heavier persons or if the prestress of the textile surface was adjusted to a lower value, a certain transmission of the load to be foamed plastic element 20 arranged underneath the textile surface 8 takes place. This foamed plastic element 20 in the form of a functional element 19 may also be at least regionally surrounded or enclosed by a separate protective layer 16. It is preferred that the entire foamed plastic element 20 is enclosed or enveloped by the protevtive layer 16 so as to prevent damages and an excessive admission of dirt into the foamed plastic structure.

It may furthermore prove advantageous to insert or embed at least one supporting device 21 in the foamed plastic element 20. This supporting device 21 may be realized, for example, in the form of the spring core that is illustrated in the right portion of FIG. 2 and consists, in particular, of stainless steel. Instead of utilizing a supporting device 21 in the form of a spring core 22, said supporting device could also be realized in the form of an additional foamed plastic element 23 that is made of a harder plastic foam than the first foamed plastic element 20 and is schematically indicated in the left portion of the foamed plastic element 20.

The foamed plastic element 20, 23 may be selected from the group of foamed plastics the comprises PUR plastic foam with preferably open-cell foam structure, plastic foam with viscoelastic properties, ester-based, open-cell PUR plastic foam with viscoelastic properties, polyimide foam, polyether foam, silicone or a silicone elastomer foam. The foamed plastic element 20, 23 may have a density value or volume weight between 30 kg/m$^3$ and 100 kg/m$^3$, preferably between 40 kg/m$^3$ and 70 kg/m$^3$. The foamed plastic element 20, 23 may furthermore have a hardness between 120 N and 450 N, preferably between 180 N and 220 N, and a compression strength of 1 kPa to 15 kPa at 40% depth of impression. However, it would also be possible to choose a density value or volume weight between 5 kg/m$^3$ and 90 kg/m$^3$, preferably between 15 kg/m$^3$ and 70 kg/m$^3$. In order to achieve a higher carrying capacity, the foamed plastic element 20, 23 may also have a hardness between 800 N and 4000 N and a compression strength between 30 kPa and 100 kPa at a 40% depth of impression. However, a hardness between 150 N and 550 N, particularly 400 N, is preferred. The compression strength of the foamed plastic element 20, 23, particularly the PUR plastic foam, may also lie between 1 kPa and 20 kPa, preferably between 5 kPa and 10 kPa at 40% depth of impression. If the foamed plastic element 20, 23 consists, for example, of an ester-based open-cell PUR plastic foam with viscoelastic properties, it may have a density or volume weight between 50 kg/m$^3$ and 80 kg/m$^3$, preferably between 60 kg/m$^3$ and 70 kg/m$^3$, and a compression strength between 6 kPa and 25 kPa at 40% depth of impression. However, the compression strength may also lie between 11 kPa and 25 kPa, preferably between 15 kPa and 20 kPa at 40% depth of impression.

In order to conform to the prescribed combustion values and the strict test standards in the aircraft industry, a flame retardant may be added to the foamed plastic element 20, 23 and/or the foamed plastic element 20, 23 may be impregnated with this flame retardant. However, this is not illustrated in order to provide a better overview.

For example, the flame retardant used may be present in powder form. In this case, the flame retardant may consist of a hydrate or a hydroxide, particularly an aluminum hydroxide or a hydrate of a zinc salt. The flame retardant may furthermore contain components that release nitrogen oxides at elevated temperatures and consist, e.g., of melamine, ammonium polyphosphate, etc. Independently thereof, the volume of the flame retardant may also increase at elevated temperature, wherein the flame retardant consist, e.g., of carbon, graphite or the like. The powdery flame retardant may be added to the foamed plastic element 20, 23 in quantities between 15 parts by weight and 50 parts by weight, preferably between 20 parts by weight and 40 parts by weight referred to the foamed plastic element 20, 23. Independently thereof, the flame retardant may also contain components that release halogens at elevated temperatures and consist, for example, of organic phosphoric acid compounds, preferably in liquid form. When using a flame retardant that releases such halogens, the added quantity may lie between 1 part by weight and 20 parts by weight, preferably between 5 parts by weight and 12 parts by weight referred to the foamed plastic element 20, 23.

For example, at least one of the functional elements 19 may be at least regionally integrated into the textile surface 8. This means that the functional element(s) 19 is/are arranged or embedded between the layers 12, 13. A connection with the pile threads can be produced at least regionally in this case. Individual sections of the functional element(s) 19 may also penetrate the layers 12, 13 and protrude from the textile surface. This simplified illustration also shows that at least one receptacle space 24 that is designed or serves for accommodating at least one functional element 19 is formed within the textile surface 8 of the knitted spacer fabric between the layers 12, 13. If the size of the receptacle space 24 within the textile surface 8 is chosen accordingly, the functional element 19 used may consist of an air cushion 25. This air cushion 25 is covered by the layers 12, 13 of the textile surface 8, wherein no pile threads are arranged in this region. The air cushion 5 may be realized such that its volume and/or hardness is variable in order to adapt the hardness of the seat and therefore the associated seating comfort. Corresponding supply units and control elements are not illustrated in order to provide a better overview and may be realized in accordance with the state of the art.

The functional element 19 may also consist of a not-shown tempering element. For example, if a resistance wire or a heating wire is used as tempering element, it can be incorporated into the textile surface 8 during or after its production. When the heating wire is supplied with electric energy, it heats up and transfers the thusly generated heat to the user. This makes it possible to create a favorable and comfortable seating climate. If the material of individual threads 9 to 11 of the textile surface 8 is chosen accordingly, these threads may form the tempering element. However, it would also be possible to realize the tempering element in the form of a tube for taking in and/or discharging a tempering medium. The tempering medium used may be present in gaseous form, liquid form or any combination thereof and consist, for example, of air, water or other non-inflammable, pourable or free-flowing elements.

The functional element 19 may also consist, for example, of an active or passive component, a sensor, a piezoelement, a Peltier element, a storage element, a transmitting element, an actuator, a display element, an optical waveguide, and element emitting invisible radiation, an integrated circuit, a switch, a plug or a transponder. The multitude of aforementioned functional elements is only cited in an exemplary fashion, wherein these functional elements can be arbitrarily combined with one another. It would also be conceivable to realize multiple arrangements. These functional elements 19 may furthermore be functionally connected to a control or evaluation device. This would make it possible, for example, to forward values determined by a sensor to the control or evaluation device via a not-shown line connection in order to carry out an adaptation to the predetermined nominal values by means of a computer unit and, if so required, the control device.

If the functional element 19 consists of the foamed plastic element 20 arranged on the side of the textile surface 8 facing away from the user, the protevtive layer 16 arranged in the region the upper side of the upholstery 5 facing the user can extend as far as a side of the foamed plastic element 20 facing away from the user as indicated with broken lines in the right portion of FIG. 2. The connecting device 18 may also provided in this case in order to fix and hold the protevtive layer.

The dot-dash lines in the lower left portion of FIG. 2 indicate that at least one other layer 26 is assigned to the functional element 19 in the form of the foamed plastic element 20, namely on the side facing away from the user. This additional layer 26 may be continuously assigned to the foamed plastic element 20 on its underside, i.e., on the side facing away from the user, and extend as far as the supporting frame(s) and be held thereon. If this layer 26 is realized with a sufficient thickness and stability, it may not only serves as a protective layer for the foamed plastic element 20, but also fulfill a bracing or supporting function for the foamed plastic element 20. In this case, it would be possible to connect the functional element 19, particularly the foamed plastic element 20, to the additional layer 26.

Another functional element 19 in the form of a foamed plastic element 20 can be arranged on the side of the textile surface 8 facing the user, i.e., in the region of the seating surface, instead of or in addition to the functional element 19 in the form of a foamed plastic element 20 that is used in the embodiment according to FIG. 2. This additional functional element 19 may be provided at least regionally or over the entire surface. Different qualities and hardnesses of the foamed plastic can be used in various combinations in order to enable the passengers to sit on the upholstery 5, in particular, for extended periods of times without essentially any discomfort. This functional element 19 in the form of the foamed plastic element 20 is not only suitable for use directly in the highly stressed seat region, but also in the region of the upholstery 5 facing the thigh of the user. The foamed plastic element 20 may furthermore extent over the front edge of the upholstery 5, i.e., the region facing the hollows of the knees of a user. The plastic element 20 in the form of the functional element 19 or the foamed plastic elements 20 may also have a different thickness or height perpendicular to the textile surface 8 and, if applicable, overlap one another, for example, in order to achieve a superior support function and a preforming of the seating surface.

Figure 3:
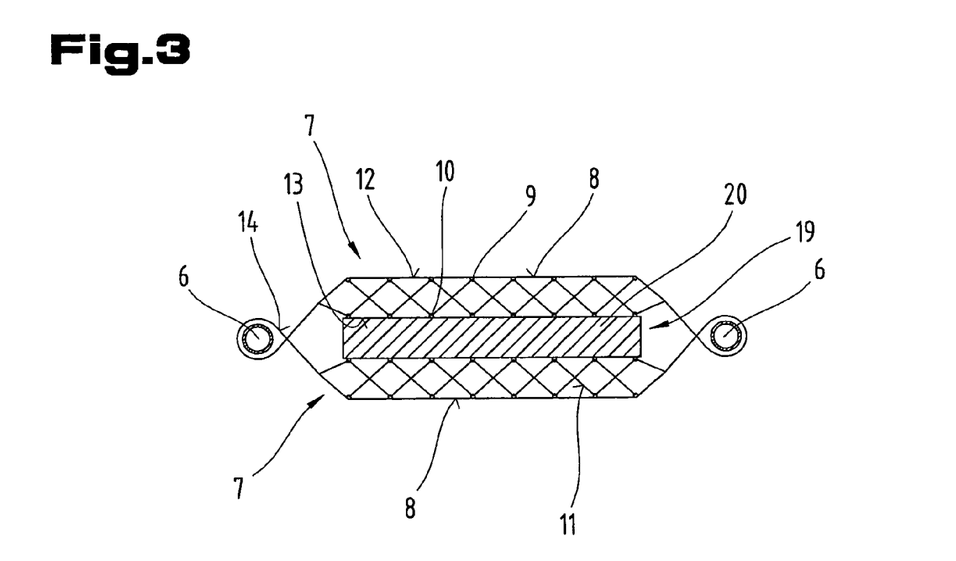
FIG. 3 another upholstery in the form of a section along the line II-II in FIG. 1.

FIG. 3 shows another optional and, if applicable, independent embodiment of the upholstery 5, wherein identical components are identified by the same reference symbols or component designations as in preceding FIGS. 1 and 2. In order to avoid unnecessary repetitions, we refer to the preceding detailed description of FIGS. 1 and 2.

In this embodiment, the upholstery 5 comprises at least two layers 7 of textile surfaces 8 of the knitted spacer fabric. This arrangement of several layers 7 of the textile surface 8 can serve for transmitting a higher forces and for better adapting the individual layers 7 to individual applications. In combination with the utilization of different qualities of threads 9 to 11, this makes it possible, for example, to subject the layer 7 facing away from the user to a thermal treatment in order to partially fuse or fuse the individual threads 9 to 11 and thusly realize a superior shield for the layer 7 facing the user.

In addition, it is possible to at least regionally arrange one of the functional elements 19 between the layers 7. In this case, the foamed plastic element 20 is chosen as the functional element 19, wherein it would also be possible, however, to realize any other combination with the previously described functional elements 19.

The embodiments represent possible design variations of the upholstery, wherein it should be noted at this point that the invention is not limited to the special embodiments thereof that are illustrated in the figures, but rather allows diverse combinations of the individual design variations and this diversity forms part of the expertise of a person skilled in the art who is active in this technical field based on the technical disclosure of the present invention. Consequently, all conceivable embodiments realized by combining individual details of the illustrated and described design variations fall under the scope of protection of the invention.

In closing, it should be noted as a matter of form that parts of the upholstery and its components are not illustrated true-to-scale and/or enlarged and/or reduced in order to better comprehend the composition of the upholstery.

The objective on which the independent inventive solutions are based can be ascertained from the description.

The individual embodiments shown in FIGS. 1; 2; 3 may, in particular, form the objects of independent inventive solutions. The pertinent objectives and solutions according to the invention are disclosed in the detailed description of these figures.

LIST OF REFERENCE NUMBERS

1 Passenger seat
2 Backrest
3 Seat part
4 Supporting frame
5 Upholstery
6 Supporting frame
7 Layer
8 Textile surface
9 Thread
10 Thread
11 Thread
12 Layer
13 Layer
14 Knitted border
15 Knitted V-belt fabric
16 Protevtive layer
17 Cover fabric
18 Connecting device
19 Functional element
20 Foamed plastic element
21 Supporting device
22 Spring core
23 Foamed plastic element
24 Receptacle space
25 Air cushion
26 Layer

What is claimed is:

1. An upholstery for a passenger seat with a first supporting frame, particularly an aircraft seat, comprising:
at least one layer in the form of a textile surface consisting of threads and/or fibers, wherein the textile surface is formed by a knitted spacer fabric composed of first layer portion and a second layer portion that are spaced apart from one another and having pile threads extending between the first and second layer portions;
a first functional element embedded between the first and second layer portions; and
a second functional element arranged on a side of the second layer portion facing away from a user, wherein the second functional element is at least one foamed plastic element, and
wherein the textile surface can be connected to a second supporting frame such that the textile surface is subjected to different prestresses that are directed parallel to the textile surface, and the second functional element is arranged such that it is spaced apart from the textile surface in a direction extending perpendicular thereto.

2. The upholstery according to claim 1, wherein the textile surface is dimensionally knitted in the form of a one-piece textile surface that has a required three-dimensional shape.

3. The upholstery according to claim 1, wherein the textile surface comprises several layers.

4. The upholstery according to claim 1, wherein the textile surface is a knitted V-belt fabric.

5. The upholstery according to claim 1, wherein a portion of the textile surface has a varying thickness.

6. The upholstery according to claim 1, wherein the textile surface features a knitted border on an outer periphery thereof.

7. The upholstery according to claim 6, wherein several openings are arranged in a longitudinal direction along the knitted border and are spaced apart from one another.

8. The upholstery according to claim 6, wherein the knitted border is a tube.

9. The upholstery according to claim 1, wherein individual threads or fibers of the textile surface of the knitted spacer fabric are provided with a coating.

10. The upholstery according to claims 1, wherein individual threads or fibers of the textile surface of the knitted spacer fabric are also provided with an impregnation.

11. The upholstery according to claim 10, wherein the coating and/or the impregnation is selected from the group consisting of nanoparticles, varnishes and surface refinements.

12. The upholstery according to claim 10, wherein the coating and/or the impregnation is flame-retardant.

13. The upholstery according to claim 1, wherein the threads or fibers consist of an organic and/or inorganic and/or metallic material.

14. The upholstery according to claim 1, wherein the threads and fibers have different elasticities and/or hardnesses and/or dimensions.

15. The upholstery according to claim 1, wherein the threads or fibers are of a material selected from the group consisting of glass, carbon, aramide, metal, steel, ceramic, plastic, carbon, cotton, hemp and animal hair.

16. The upholstery according to claim 1, wherein the fibers consist of elastomer fibers of polyurethane, polyether amide, polyetherester amide, polyolefin components, polyester components or a mixture thereof.

17. The upholstery according to claim 16, wherein the elastomer fibers consist of commercially available elastomer fibers or bicomponent fibers.

18. The upholstery according to claim 1, wherein the fibers or threads are staple fibers selected from the group consisting of aramide and/or paraaramide fibers, aramide of m-phenylenediamin and isophthalic acid, Technora, Teijinconex, phenol-formaldehyde fibers, polyamide/polyimide fibers, polybenzimidasole fibers and fiber mixtures thereof.

19. The upholstery according to claim 18, wherein the aramide and/or paraaramide fibers are mixed with carbon fibers Zefstat, Negastat, Resistat, steel fibers, copper fibers and/or metal fibers.

20. The upholstery according to claim 18, wherein the aramide and/or paraaramide fibers are mixed with carbon or metal fibers and elastomer fibers.

21. The upholstery according to claim 1, wherein individual threads or fibers of the textile surface of the knitted spacer fabric are flame-retardant.

22. The upholstery according to claim 1, wherein individual threads or fibers of the textile surface of the knitted spacer fabric are electrically conductive.

23. The upholstery according to claim 1, wherein an at least one additional layer is arranged on the second functional element on the side facing away from the user.

24. The upholstery according to claim 23, wherein the second functional element is connected to the additional layer.

25. The upholstery according to claim 1, wherein third functional element is arranged on the side of the textile surface facing the user.

26. The upholstery according to claim 1, wherein the first functional element is housed in receptacle space formed between the first and second layer portions of the knitted spacer fabric.

27. The upholstery according to claim 26, wherein the volume and/or hardness of the air cushion can be changed.

28. The upholstery according to claim 1, wherein the second functional element is a material selected from the group consisting of PUR-plastic foam with open-cell foam structure, plastic foam with viscoelastic properties, ester-based open-cell PUR plastic foam with viscoelastic properties, polyimide foam, polyether foam, silicone foam and silicone elastomer foam.

29. The upholstery according to claim 1, wherein the second functional element has a density or volume weight between 30 kg/m$^3$ and 100 kg/m$^3$, preferably between 40 kg/m$^3$ and 70 kg/m$^3$.

30. The upholstery according to claim 26, wherein the second functional element has a hardness between 120 N and 450 N, preferably between 180 N and 220 N, and a compression strength of 1 kPa to 15 kPa at 40% depth of impression.

31. The upholstery according to claim 1, wherein the second functional element has a density or volume weight between 5 kg/m$^3$ and 90 kg/m$^3$, preferably between 15 kg/m$^3$ and 70 kg/m$^3$.

32. The upholstery according to claim 1, wherein the second functional element has a hardness between 800 N and 4000 N and a compression strength between 30 kPa and 100 kPa at 40% depth of impression.

33. The upholstery according to claim 1, wherein the second functional element has a hardness between 150 N and 550 N, preferably 400 N.

34. The upholstery according to claim 1, wherein the compression strength of the second functional element lies between 1 kPa and 20 kPa, preferably between 5 kPa and 10 kPa at 40% depth of impression.

35. The upholstery according to claim 1, wherein the second functional element has a density or volume weight between 50 kg/m$^3$ and 80 kg/m$^3$, preferably between 60 kg/m$^3$ and 70 kg/m$^3$, and wherein the at least one foamed plastic element preferably consists of an ester-based open-cell PUR plastic foam with viscoelastic properties that has a compression strength between 6 kPa and 25 kPa at 40% depth of impression.

36. The upholstery according to claim 1, wherein at least one supporting device is inserted or embedded in the at least one foamed plastic element.

37. The upholstery according to claim 36, wherein the supporting device consists of a stainless steel spring core.

38. The upholstery according to claim 1, wherein an at least one flame retardant is added to the second functional element and/or the at least one foamed plastic element is impregnated with a flame retardant.

39. The upholstery according to claim 38, wherein the at least one flame retardant is selected from the group consisting of melamine and ammonium polyphosphate and contains components that release nitrous oxides at elevated temperatures.

40. The upholstery according to claim 38, wherein the volume of the at least one flame retardant increases at elevated temperatures and the at least one flame retardant is selected from the group consisting of carbon and graphite.

41. The upholstery according to claim 1, further comprising a protective layer having at least one layer.

42. The upholstery according to claim 41, wherein the protective layer consists of a flame-retarding cover fabric.

43. The upholstery according to claim 41, wherein the protective layer is at least arranged in the region of the upholstery facing a user.

44. An upholstery for a passenger seat with a first supporting frame, particularly an aircraft seat, comprising at least one layer in the form of a textile surface consisting of threads and/or fibers, wherein the textile surface is formed by a knitted spacer fabric composed of at least two layers that are spaced apart from one another and pile threads extending therebetween, and the textile surface includes a knitted border on an outer periphery thereof, wherein several openings are spaced apart from one another and are arranged in a longitudinal direction along the knitted border, and wherein the textile surface can be connected to a second supporting frame such that the textile surface is subjected to different pre-stresses that are directed parallel to the textile surface.

* * * * *

UNITED STATES PATENT AND TRADEMARK OFFICE
CERTIFICATE OF CORRECTION

PATENT NO. : 7,607,730 B2  Page 1 of 1
APPLICATION NO. : 11/499324
DATED : October 27, 2009
INVENTOR(S) : Johann Moseneder It is certified that error appears in the above-identified patent and that said Letters Patent is hereby corrected as shown below:

Col. 1, Line 12, "by a knitted" should read -- A knitted --.
Col. 2, Line 35, "needless" should read -- needles --.
Col. 2, Line 59, "but also" should read -- but are also --.
Col. 3, Line 66, "frame is" should read -- frame are --.
Col. 4, Line 3, "as a well" should read -- as well --.
Col. 5, Line 16, "return" should read -- returned --.
Col. 5, Line 43, "return" should read -- returned --.
Col. 8, Line 19, "designation" should read -- designations --.
Col. 8, Line 27, "comprise" should read -- comprises --.
Col. 9, Line 5, "spaces" should read -- space --.
Col. 11, Line 18, "protevtive" should read -- protective --.
Col. 11, Line 20, "protevtive" should read -- protective --.
Col. 11, Line 27, "protevtive" should read -- protective --.
Col. 11, Line 30, "protevtive" should read -- protective --.
Col. 11, Line 63, "protevtive" should read -- protective --.
Col. 12, Line 10, "plastics the comprises" should read -- plastics that comprises --.
Col. 12, Line 54, "consist" should read -- consists --.
Col. 13, Line 58, "protevtive" should read -- protective --.
Col. 13, Line 63, "protevtive" should read -- protective --.
Col. 15, Claim 1, Line 47, "of first" should read -- of a first --.
Col. 16, Claim 10, Line 16, "claims" should read -- claim --.
Col. 17, Claim 25, Line 1, "wherein third" should read -- wherein a third --.
Col. 17, Claim 26, Line 5, "in receptacle" should read -- in a receptacle --.

Signed and Sealed this

Fourteenth Day of December, 2010

David J. Kappos
*Director of the United States Patent and Trademark Office*